United States Patent [19]
Digney

[11] 4,000,494
[45] Dec. 28, 1976

[54] PRINTING APPARATUS FOR MULTIPOINT RECORDER

[75] Inventor: Charles J. Digney, Holland, Pa.

[73] Assignee: Honeywell Inc., Minneapolis, Minn.

[22] Filed: May 23, 1975

[21] Appl. No.: 580,319

[52] U.S. Cl. .................................. 346/61; 346/46; 346/141

[51] Int. Cl.² .................. G01D 9/28; G01D 15/00

[58] Field of Search ................ 346/34, 46, 51, 61, 346/141

[56] References Cited

UNITED STATES PATENTS

| | | | |
|---|---|---|---|
| 2,328,664 | 9/1943 | Moore | 346/46 |
| 2,761,068 | 8/1956 | Geisler | 346/46 X |
| 3,577,149 | 5/1971 | Carpino | 346/46 |
| 3,611,412 | 10/1971 | Gibby | 346/61 |
| 3,739,384 | 6/1973 | Harkins | 346/140 A |
| 3,761,949 | 9/1973 | Hasebe et al. | 346/46 |
| 3,769,626 | 10/1973 | McClenahan | 346/61 |
| 3,838,430 | 9/1974 | Digney | 346/61 |

*Primary Examiner*—George H. Miller, Jr.
*Attorney, Agent, or Firm*—Laurence J. Marhoefer; Lockwood D. Burton; George E. Bodenstein

[57] ABSTRACT

A continuously rotatable shaft is employed in a multipoint recorder for slidably and rotatably supporting a print carriage thereon in order to minimize the friction occurring between the print carriage and the shaft while the carriage traverses the shaft and as a print wheel supported by the carriage is rocked into and out of printing engagement with a record medium. A print pad wheel is provided with characterized gear teeth for meshing with characterized gear teeth of the print wheel. This print pad-print wheel construction allows each of the markers on the outer surface of the print wheel to be brought into proper precise color alignment with an associated colored ink pad formed in the ink pad wheel as the print wheel is directly indexed by a pawl and ratchet drive from one print position to another.

9 Claims, 7 Drawing Figures

FIG. I

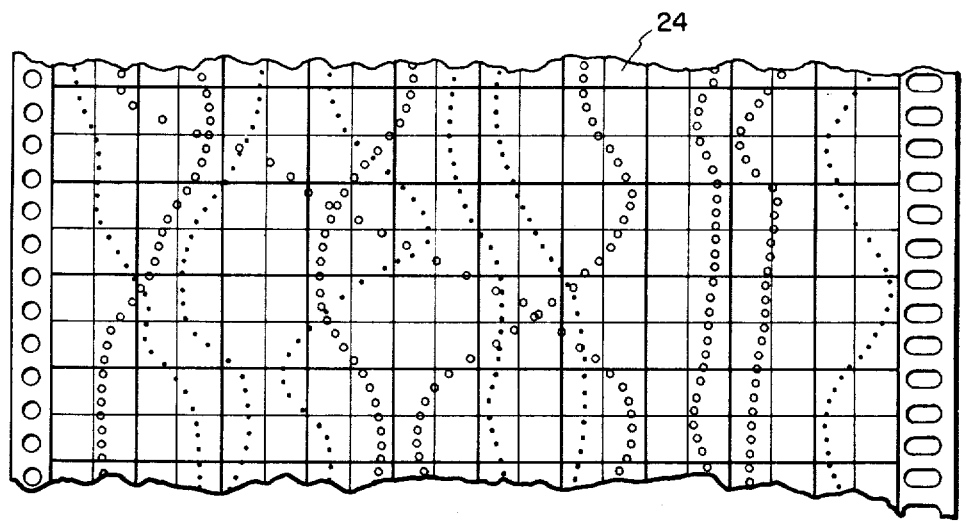
F I G . 6
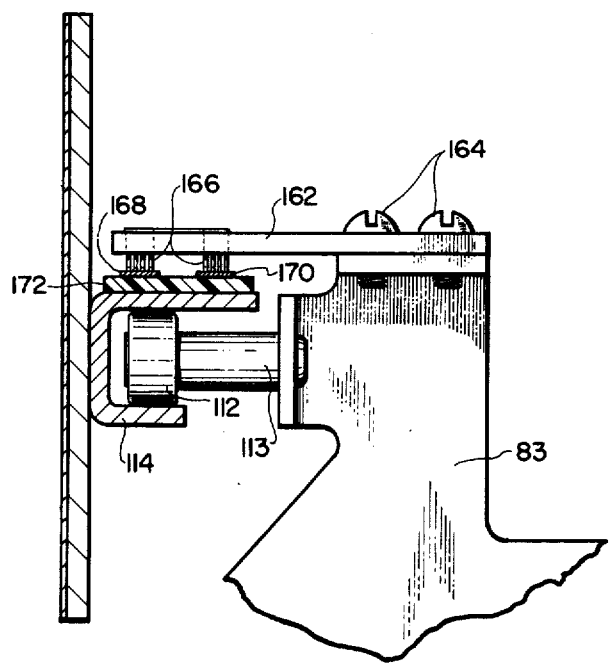
F I G . 7

PRINTING APPARATUS FOR MULTIPOINT RECORDER

BACKGROUND OF THE INVENTION

1. Field of the Invention

The invention relates to improvements in multipoint strip chart recorders.

2. Description of the Prior Art

Print mechanisms ebodying record distinguishing means for multiple point strip chart recorders have been known and employed in industry for many years. Such print mechanisms generally have operated in a single mode, identifying each quantity under measurement by a characteristic mark or color.

Several forms of the prior printing mechanism are illustrated in U.S. Pat. Nos. 2,328,664; 2,525,094 and 2,421,834. Each of these prior printing mechanisms employ a single print wheel mounted on a print carriage, that has a plurality of marking elements on the peripheral portion thereof. When a mark is to be printed, the print wheel is tilted to a precise angle with respect to a chart or other record medium to place a single one of its marking elements in a position to make a mark on this record medium.

The print carriages of some of these prior art multipoint printing mechanisms are mounted for sliding along a spline shaft and are equipped with rollers which ride along a guide rod or channel so that the print carriage can be moved across the top of the chart from one printing position to the other. This rolling action of the roller along the channel has a tendency to produce an undesired amount of static friction due to the sticking-slipping movement between the roller and channel as the print carriage traverses the record medium.

Other more recent recorders mount their print carriage for slidable movement along a stationary rod that extends between and which is fixed to the opposite side of the chassis of these recorders such as is disclosed in my U.S. Pat. No. 3,838,430. Here again, stick-slipping movement of the carriage along a stationary rod takes place that has a tendency to produce undesired static friction between the carriage and the rod on which it is mounted.

Recorders of the aforementioned type employ ink wheels which contain inked pads that are of a different selected color against each one of which a different mark on an associated print wheel is engaged before that mark is brought into printing contact with the record medium.

Each of the ink pads on the ink wheel and the associated marking elements on the print wheel, that are employed in the previously-referred to prior art multipoint offset printing recording devices have a tendency, due to differences in the amount of backlash occurring in their separate gear drives, to move out of color synchronism with one another as their ink pad and print wheels are advanced by their separate indexing gearing and/or pawl and ratchet driving units from one printing position to another.

When a small displacement of the multicolor ink wheel relative to the print wheel takes place, due to gear train backlash, the print wheel characters contact two different color ink pads and thus cause color transfer to occur from one pad to the next. After a relatively short time this action causes the color of the ink in each pad to mix with the color of its adjacent pad. This later action results in a degrading of the colors which the print wheel can then print on the record medium.

Another disadvantage in employing gear trains to drive ink wheels and point wheels is the high cost involved in the manufacture and assemblying of the gears that are used by these gear trains.

SUMMARY OF THE INVENTION

It is, accordingly, an object of the present invention to provide an improved mounting structure for the print carriage of a multi-point recorder which will allow the carriage to traverse such a mounting structure without any sticking-slipping movement occurring between these parts.

It is another object of the present invention to provide an improved print wheel driving mechanism for indexing a print wheel and its associated ink pad wheel simultaneously that does not require a separate costly gear train to drive each wheel as is required by prior art driving mechanisms.

It is another object of the invention to provide an improved print wheel driving mechanism for indexing a print wheel and its associated ink pad wheel simultaneously to thereby eliminate (a) the previously mentioned backlash that is inherent in the aforementioned gear trains, (b) a resulting mixture of inks between adjacent pads from occurring and grade of printing to be effected by the print wheel on the record medium.

In accomplishing these and other objects there has been provided: (a) a continuously rotating guide shaft in lieu of a conventional stationary shaft, on which the print wheel carriage can be mounted for rotary and slidable transverse movement in order to reduce the high transverse carriage static friction force that has been experienced when stationary rods are used and to a lower dynamic friction force as the carriage is moved therealong;

b. an improved orbiting rod drive structure for rocking the print wheel carriage and its associated print wheel into and out of a print position with a chart that requires fewer gears and shafts than that employed by the orbiting rod drive mechanism disclosed in my U.S. Pat. No. 3,838,430;

c. gear teeth on the outer peripheral portion of an ink pad wheel for meshing with the teeth of a print wheel so that each of the markers on the outer surface of the print wheel will always be brought into proper precise color alignment with an associated colored pad formed in the ink pad wheel and without introducing backlash therein, as the print wheel is indexed from one print position to another;

d. an improved print wheel driving mechanism comprised of a dual pawl driven ratchet wheel and print wheel that are adjacent to one another and fixedly connected to opposite ends of the same shaft for rotation therewith and e. a print wheel of the aforementioned type that has the addendum portion of its gear teeth removed and a series of dot and circle marker portions extending from its outer periphery and a print pad wheel of the aforementioned type that has the dedendum portion of its teeth removed to accommodate the insertion of ink pads therein and to provide a means by which each of the marks on the print wheel can be readily rolled into and out of good inking contact with the successive ink wheel pads that are associated with these markers.

DESCRIPTION OF THE DRAWINGS

A better understanding of the present invention may be had when the following detailed description is read in connection with the following drawings in which:

FIG. 6 shows a typical record that is printed on a chart by the printing mechanism; and FIG. 7 shows a roller supporting a carriage support plate for longitudinal movement along the face of the recorder and a slide wire wiper positioned for direct longitudinal movement with the plate and for sliding contact with a slide wire.

DESCRIPTION OF THE PREFERRED EMBODIMENT

Figure 1:
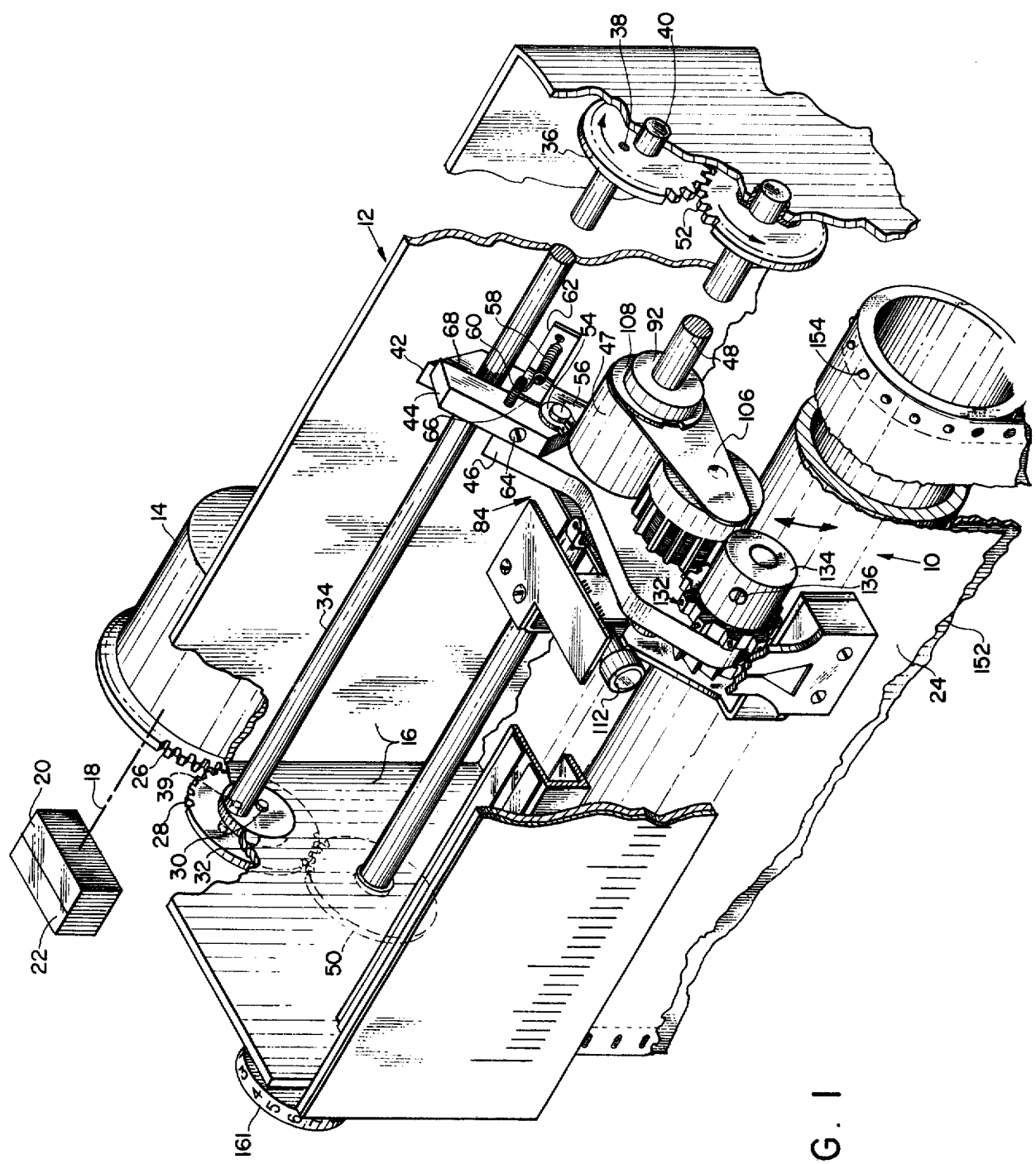
FIG. 1 is a perspective view taken from the lower right front end of the multi-point strip chart recorder and illustrates the improved orbiting rod driven print wheel actuating mechanism and the meshing gear teeth that are formed on the printing and ink wheels of the improved print mechanism according to the present invention.
Figure 2:
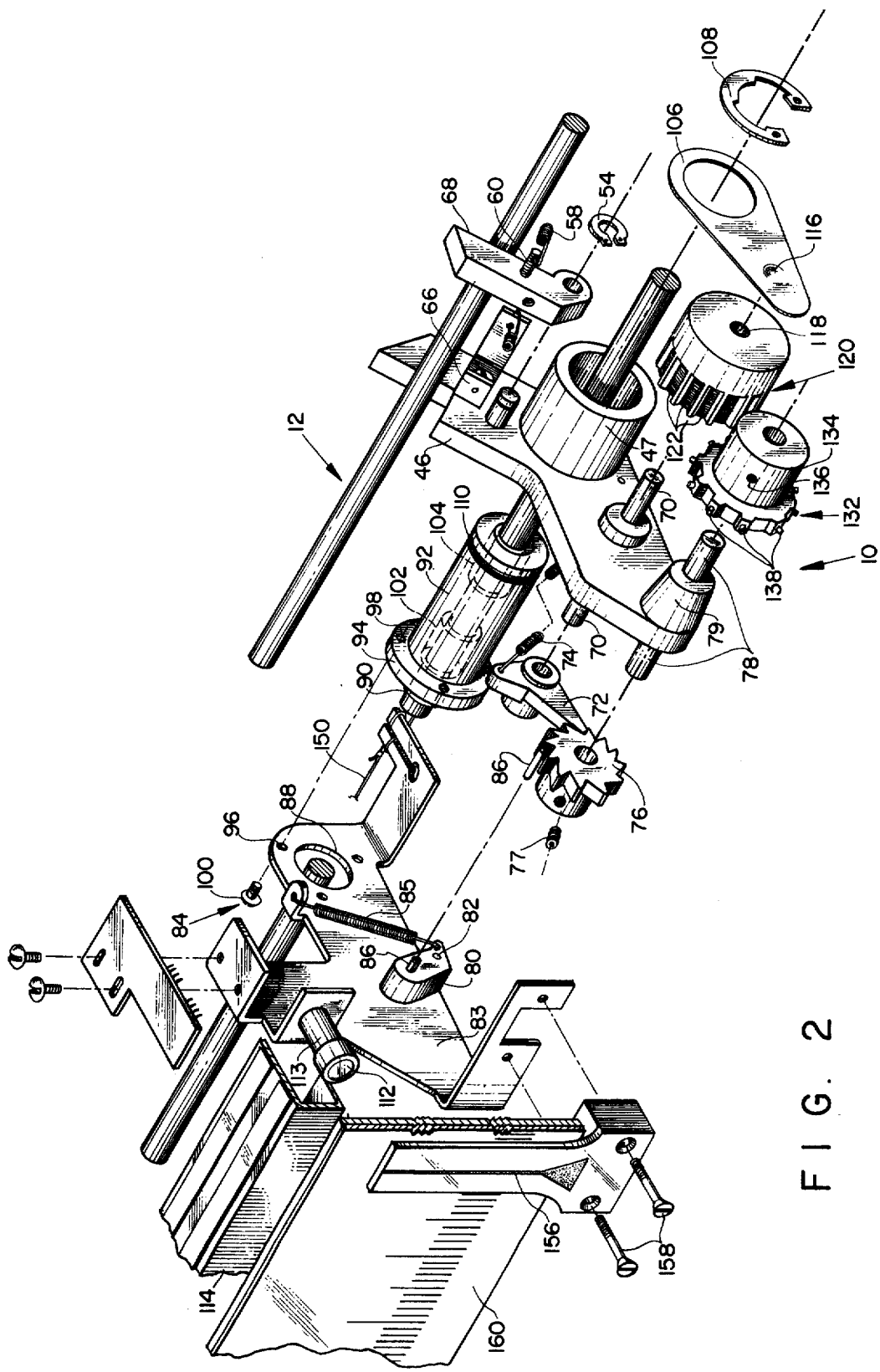
FIG. 2 is an exploded isometric view taken from the upper right front end of the recorder of FIG. 1 and illustrates how a pawl and ratchet mechanism is interconnected to a print wheel and inking wheel to effect a step by step advancement of the print wheel.

For an understanding of the preferred embodiment of the invention, reference is first made to the prospective view of FIG. 1 which shows the improved drive for a print mechanism 10 of a multipoint recorder 12 and FIG. 2 which shows an exploded isometric view of the parts of this improved drive mechanism 10.

The back wall of a chassis 16 of the recorder 12 supports drive motor 14 which drives the print mechanism 10. A suitable mechanical drive 18 connects drive motor 14 to a Geneva movement 20 which in turn drives a multiple point input selector switch unit 22. The selector switch unit 22, which is of a conventional type, selectively connects, one after another, a number of different input variable quantities, such as voltages or currents. Each of these represents a different variable under measurement, which is recorded by the recorder 12 in the manner described, for example, in U.S. Pat. No. 3,576,582 to Robert T. Smith or U.S. Pat. No. 2,427,480 to John A. Caldwell. It will be understood, however, that any one of many commercially available recorders may be modified in a manner to incorporate the improved print mechanism of applicant's invention. FIG. 6 shows a chart 24 on which six different selected colored dots and six different colored circles are imprinted by the recorder 12 shown in FIG. 1.

Although not shown, a conventional motor driven gear driving mechanism moves the chart 24 between a chart supply roll and a chart take-up roll in a manner similar to that shown in my U.S. Pat. No. 3,838,430.

As is best shown in FIG. 1, the output drive shaft 18 of the drive motor 14 carries a drive gear 26 that is fixed for rotation therewith. The gear 26 drives gear 28 that is fixed to a shaft 30 that is mounted for rotation on one side of the U-shaped chassis 16. A disc 32 is fixed to the other end of the shaft 30 for rotation therewith. A rod, hereinafter referred to as an orbiting rod 34, extends between the disc 32 and gear 36. The right end portion 38 of the orbiting rod 34 extends through the facing surfaces of the gear 36 and its opposite end portion 39 extends through the facing surfaces of the disc 32. The gear 36 is fixed to the shaft 40 which is mounted for rotation on the other side of the U-shaped chassis 16 and has a longitudinal axis that is in alignment with the longitudinal axis of the shaft 30. The radial dimension between the longitudinal axis of shaft 30 and the longitudinal axis of the orbiting rod 34 is the same as the radial dimension between the longitudinal axis of the shaft 40 and the orbiting rod 34. The orbiting rod 34 is of a rigid construction and preferably has a polished surface, and for example, may be made of steel. The rod 34 is arranged to move in unison with the rotation of the gears 28, 36. The locus of the movement of the rod 34 about the centers of the gears 28, 36 is the surface of a cylinder. One of the positions through which the orbiting rod 34 will pass in its orbital path is shown in solid line form in FIG. 1.

The orbiting rod 34 as seen in FIGS. 1 and 2 is embraced by a pair of spaced apart members 42 and 44 which for convenience, are designated runners. The runners 42 and 44 preferably are formed of material which substantially will retain its original shape over long periods of time notwithstanding changes in the environment to which the material is exposed during the operation of the print mechanism and recorder. The acetal resin bearing material such as that known by the Trade Mark as "Delrin" has been found suitable for the runners 42 and 44.

As seen in FIGS. 1 and 2, runner 42 extends from an end of a J-shaped print actuating lever 46 which lever is mounted for pivotal movement by means of its hub portion 47 on the shaft 48. The lever 46 and its hub portion 47 are made of the same acetal resin bearing material as the runners 42, 44. The ends of the shaft 48 are suitably mounted for rotation on opposite side portions of the U-shaped chassis 16. separate gears 50, 52 are fixedly mounted on the opposite end portions of the shaft 48. The gear 50 is positioned in driven engagement with the driving gear 28 and the gear 52 is positioned in driven engagement with the driving gear 36.

The runner 44 is retained by means of a ring-shaped cotter 54 in privoted relationship on a stub shaft 56 which is fixed for joint rockable movement therewith at its inner end to the lever 46. The runner 44 is spring biased by a spring biasing means 58 toward the runner 42. The runners 44 and 42 provides surfaces along which the orbiting rod 34 can slide. FIGS. 1 and 2 show the spring biasing means in the form of a coil spring 58. One end of the spring 58 is attached to a threaded stud member 60 that is threadedly connected to and extends from the side of the runner 44 as shown in FIGS. 1 and 2.

The other end of the coil spring 58 is attached to an end of a substantially U-shaped bracket 62 that is fixedly mounted on the lever 46.

A screw 64 is threadedly connected to and extends through the bottom portion of the runner 44 for engaging the surface 66 of the U-shaped bracket 62. The screw 64 is adjusted to a position that will allow the spring 58 to maintain the surface 68 of the runner 44 in surface-to-surface contact with the orbiting rod 34. The runners 42 and 44 are thus shown held in a separated condition even though the runner 44 is spring biased toward the runner 42.

FIG. 2 shows a stub shaft 70 fixed to and extending away from the opposite sides of the lever 46. A pawl 72 in the form of a crank arm is rotatably mounted on one end of the stud shaft 70. The coil spring 74 is connected at one end to the left side of the plate 46 and to the pawl 72 at its other end. The pawl 72 is shown retained in driving engagement with a tooth of a ratchet wheel 76. The ratchet wheel 76 is fixedly mounted by means of a set screw 77 to a stub shaft 78. The stub shaft 78 is rotatably mounted on and extends through the opposite side of the lever 46 and a boss portion 79 thereof.

A second or stop pawl 80 is rotatably mounted on one end of a stub shaft 82 that is fixed to a carriage support plate 83 of the carriage 84. A coil spring 85 is connected at one end to the plate 83 and to the pawl 80 at its other end. The pawl 80 has a stop pin portion 86 extending into engagement with another tooth of the ratchet wheel 76 and is retained in spring biased engagement therewith by the spring 85.

The carriage support plate 83 has a wall 88 forming a cylindrical opening therein for mounting it on the left end portion 90 of a sleeve shaped pivot member 92. A shoulder 94 of the pivot member 92 and the carriage support plate 84 each have a number of spaced apart openings therein, e.g., the bored out openings 96, and the threaded open wall portions 98. A separate screw connecting means, for example, 100 passes through each pair of the aligned openings 96, 98.

Two bearings, 102, 104, made from wafer thin single resilient sheets of material that are preferably any suitable commercially available tape bearing materials, such as glass filled TFE fluorocarbon resin and marketed under the trademark "Rulon" are used to rotatably support the pivot member 92 on the shaft 48. The pivot member 92 and its bearings 102, 104 are positioned in rotatable contact within the inner bearing wall surface of the hub portion 47 of the lever 46 as is best shown in FIG. 2.

A retainer plate 106 is laterally mounted for rotation against a right end surface portion of hub 47 and about the right cylindrical end of the pivot member 92.

A snap-in type retainer 108 is mounted in the groove 110 of the member 92 and against the right side of the retainer plate 106 to retain the pivot member 92 and the carriage 84 and the parts mounted on the member 92 and plate 83 in position for slidable movement as a single carriage unit, FIG. 1, along the rotatable shaft 48.

A roller 112 that is in the form of a ball bearing is mounted on the outer end of a stub shaft 113. The inner end of the shaft 113 is fixed to and forms an integral part of the carriage support plate 83. The roller 112 is shown positioned for longitudinal rotatable engagement along a stationary guide channel 114.

The outer end of the retainer plate 106 contains a dimple portion 116 that engages a wall 118 that forms an opening in the end of an ink pad wheel 120. The ink pad wheel 120 is mounted for rotation about the stub shaft 70 and contains twelve spaced apart ink pads 122. Each one of six consecutive ink pads 122 of the 12 ink pad wheel 120 contains a different colored ink and the next six successive pads each contain a different colored ink that is in the same sequence as the first-mentioned six pads 122.

Figure 3:
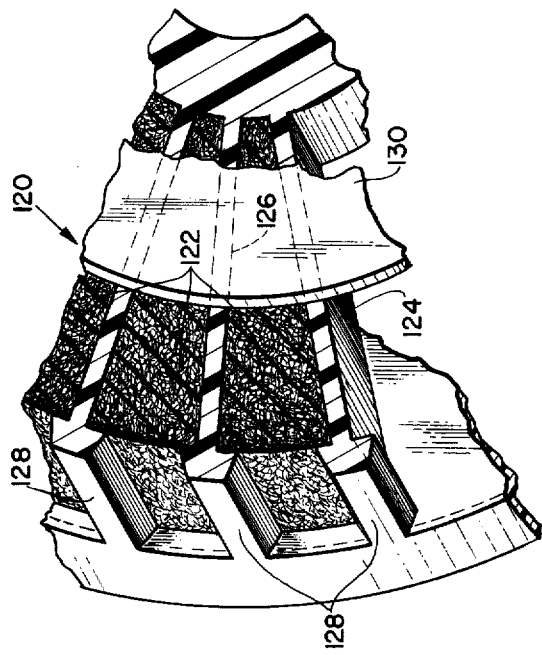
FIG. 3 is a view of a portion of the print pad wheel in partial cross-section.

Each ink pad 122 is of a wedge shaped configuration and is positioned between a pair of partitions 124, 126 as shown in FIGS. 1 and 3. FIG. 3 shows the outer end of each partition, e.g., 124 having a gear tooth 128 formed thereon whose dedendum is removed. The ink pad wheel 120 has a rear flat surface 130 against which an end of each ink pad is in contact.

Figure 4:
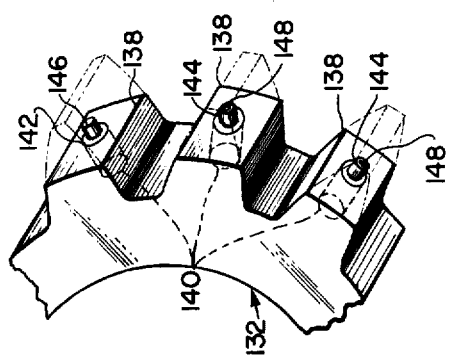
FIG. 4 is a view of a portion of the print wheel and the dot and circle markers mounted thereon.

A print wheel 132 and a hub portion 134 mounted on the right end of rotatable shaft 78 by means of a set screw 136. Involute teeth 138 are formed on the outer periphery of the print wheel 132 that each have their addendum portion removed as shown in phantom line form in FIG. 4. The center portion of each tooth 138 contains a bored out hole 140 therein into which the cylindrical members 142, 144 are retained in press fit engagement. Each one of six consecutive cylindrical members 142 on the print wheel 132 has a pin shaped, or dot, marking member 146 that terminates in a flat cylindrical surface at its upper end. Each of the remaining six cylindrical members 144 contain a pin shaped marking member 148, that is of the same dimension as marking member 146, but whose upper center portion is bored out to form circle shaped markers.

Figure 5:
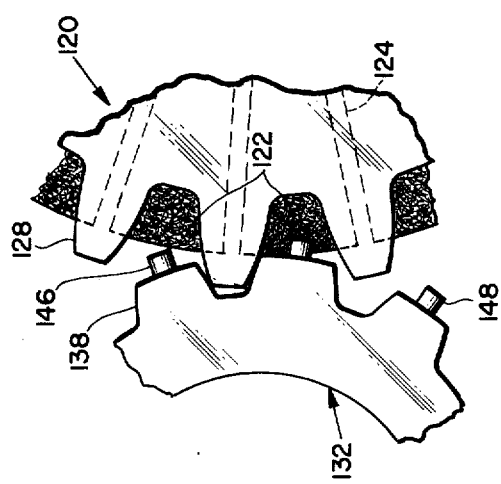
FIG. 5 shows an enlarged section of the print wheel of FIG. 4 in inking engagement with teeth formed on the print pad wheel of FIG. 3.

FIGS. 2 and 5 show the teeth 138 of the print wheel 132 in mesh with teeth 128 of the ink pad wheel 120. FIG. 5 shows one of the circle shaped markers 148, mounted on the top of one of the teeth 138 of the print wheel 132, as it is being rolled into engagement with the wedge that forms a first color pad 122 and a dot marking member 146 in a position immediately before it is brought into engagement with another ink pad 122 that is of a different color than the first mentioned ink pad.

MULTIPOINT BALANCABLE POTENTIOMETRIC MEASURING SYSTEM

In the operation of the present invention as previously noted, the carriage 84 of the improved printing mechanism is brought to successively different printing locations above the chart 24 as the associated self-balancing potentiometer mechanism is balanced for each of the input quantities under measurement. At the same time the printing mechanism is actuated to ratchet print wheel 132 to its next printing location above the chart in timed relation to the rocking of the actuating plate 46 by the continued orbiting of rod 34. To this end the recorder apparatus illustrated in the drawings includes a conventional potentiometric servo-balancing mechanism (not shown) having a balancing motor (also not shown) which moves the carriage unit 84 as by means of a cable or wire 150 as seen in FIG. 2 across the above chart 24 to each of the successive printing positions as the potentiometer mechanism is repetitively balanced for each of the input quantities under measurement.

The structure for supporting the carriage 84 in its back and forth movement across the chart 24 includes a single shaft 48 which extends between and is supported for rotation by the bearing shown in the sides of the U-shaped chassis 16 of the recorder 12. Specifically, shaft 48 extends through the bearings 102, 104 in the pivot member 92 of the carriage 84. The bearings 102, 104 which are carried by the pivot member 92 slides along the rotatable shaft 48. The carriage 84 is thus constrained by the shaft 48 and the channel 114 engaged by the roller 112 that is mounted on the carriage support plate 84 for movement along the coordinate axis of the chart that is parallel to the platen 152 and the chart driving sprocket roller 154.

For the purpose of preventing movement of the carriage 84 along the chart during the period of time that a printing operation is taking place, and the print wheel 132 is in marking engagement with the chart, a switch (not shown) is used that is electrically connected to the self-balancing electrical motor for momentarily disengaging the motor during such marking period or interval. This switch may be the same type as that disclosed in my previous-mentioned U.S. Pat. No. 3,838,430.

Such a switch is arranged to be actuated by the orbiting rod 34 to disconnect the electrical power to the balance motor an instant before the print wheel 132 is brought into marking engagement with the chart 24 and for re-establishing that power connection immediately after the print wheel has been lifted off the chart 24.

FIG. 2 shows an indicating pointer 156 attached by means of a pair of screw connectors 158 to the carriage support plate 83 for movement across the chart 24. The pointer 156 is positioned in front of an indicating scale 160 of the potentiometric measuring instrument and provides a visual indicating of the magnitude of the variable being recorded on the chart 24.

FIG. 1 shows point indicating wheel 161 containing a continuous series of numbers that are numbered from one to twelve thereon is rotatably mounted on the left side of the chassis 16. The point indicating wheel 161 is operably connected by a belt drive, not shown, for intermittent accurate movement by the selector switch unit 22 to indicate the point on the print wheel 132 that is being recorded on the chart at any instant of time.

FIG. 7 shows an arm 162 connected at one end by a pair of screw connectors 164 to the carriage support plate 83. The other end of the arm 162 has two identical conductive spring biased wiper contacts 166 each made of a plurality of fine wires and extending from the underside thereof. These wiper contacts are engaged with a collector 168 and slide wire 170 supported in fixed engagement on an insulating plate 172 that is mounted on the top surface of the guide channel 114.

ORBITING ROD DRIVE

By referring to FIG. 1, it is seen that the rotation of the shaft 18 of the drive motor 14 is transmitted by way of gear 26, 28 and disc 32 to rod 34 which extends between the disc 32 and gear 36. The rod 34 is thus made to orbit in a path in the direction of the arrow about the center of the shafts 30, 40 which support the disc 32 and gear 36 on chassis 16.

As the motion of the rod 34 in its orbital path takes place, the rod alternately slides in a downward direction along the adjacent surface of runner 42 and then moves away from contact with the runner 42 and slides in an upward direction along the adjacent runner 44. In the position shown in FIG. 1, the rod 34 is in engagement with the runner 42 to move the latter and the lever 46 in a clockwise direction about the shaft 48. The shaft 48 is rotatably driven at its opposite ends by two pairs of gears, namely the gears 28, 50; 36, 52.

When the orbiting rod is in engagement with the runner 44 it will move the runner 44 and the lever 46 in a counter-clockwise direction.

Specifically, during the portion of the cycle that the orbiting rod 34 is effective to apply a force to the runner 42 that forms an end portion of the lever 46, the lever 46 will be moved in a clockwise direction about the axis of the rotating shaft 48 to a non-printing position. During the portion of the cycle that the orbiting rod 34 is effective to apply a force to the runner 44, the lever 46 will be moved in a counter-clockwise direction from the non-printing position, as shown, to a printing position.

By reference to FIG. 1, it can be seen that as the orbiting rod 34 completes a full revolution, or 360° orbit, the lever 46 will be moved from its non-printing position as shown back to its printing position. The orbiting rod 34 will thus cause the lever 46 to be continuously rocked into and out of a printing position while the shaft 48 on which the rocking of the lever 34 occurs is continuously rotated.

PRINT WHEEL ADVANCE ESCAPEMENT MECHANISM

Referring to FIGS. 1 and 2, it can be seen that upon movement of the carriage actuating support plate 46, in a clockwise direction, the advance pawl 72 will engage a tooth on the ratchet wheel 76 and thereby cause the latter, its associated shaft 78 and print wheel 132 to be advanced one step in a clockwise direction relative to the carriage actuating plate 46. During such clockwise movement of the support plate 46, the part 86 of the stop pawl 90 slides in a counter-clockwise direction out of engagement with a tooth on the ratchet wheel 76 over the outer surface of and into non-driving contact with an adjacent tooth of the ratchet wheel 76. As the carriage actuating plate 46 is thereafter moved in the clockwise direction, part 86 of the stop pawl 80 is brought into counter-clockwise direction relative to the carriage base plate 84 without advancing the print wheel 132. This counter-clockwise movement of the ratchet wheel 76 occurs while the advance pawl 72 slides over a tooth on the then movable ratchet wheel 46 and into a position for engaging the next adjacent tooth of this ratchet wheel 46.

Simultaneous step-by-step advancement of the ratchet wheel 76 is transmitted by shaft 78 to the print wheel 132 and thereby to the multi-colored ink pad wheel 120 by the print wheel 132.

Since the print wheel 132 has the same number of teeth as the print pad wheel 120, both of these wheels 132, 120 are rotated through the same angular distance as that through which ratchet 76 passes during each tooth to tooth advancement of the ratchet wheel 76.

PRINTING

A continuous series of different colored dots followed by a similar series of circles having the same color sequence will be continuously printed by markers 146, 148 on the chart 24 as the carriage actuating lever 46 and the print wheel 132 mounted thereon is rocked in a to and fro manner about the axis of the continuously rotating shaft 48 by the movement of the orbiting rod 34.

PRINT WHEEL-INK WHEEL DRIVE AND INKING MECHANISM

In the recording operation of the printing mechanism, a first series of dot markers 146, that are each of a different color, and then a similar number of circle markers 148, that are in a similar color sequence as the dot markers, are successively brought into printing or marking engagement with the chart 24. A different tooth of the print wheel 132 is brought into engagement with associated teeth formed on the ink pad wheel 120 each time the lever 46 moves the print wheel away from its printing position and before the lever 46 commences to move a marker 146 or 148 of the print wheel toward and into printing engagement with the chart 24. Providing teeth on the ink pad 120 that are in mesh with the teeth on the print wheel 132 thus allows the wheels to be continuously maintained in exact synchronized angular displacement with one another.

Each one of the dot and circle markers 146, 148 on the print wheel can thus be easily rolled in succession and in a precise manner into and out of contact with a center portion of its associate colored ink pad 122 as the print wheel 132 is moved by the stepping movement of the ratchet wheel 76 and by means of the shaft 78 and set screw connection 136 from one marking point to the other.

The embodiments of the invention in which an exclusive property or privilege is claimed are defined as follows:

1. An ink wheel for a multiple point recorder, comprising spaced apart gear teeth forming the peripheral surface of said ink wheel, each of said teeth having a dedendum portion thereof removed to the pitch circle thereof, a hub portion, radial plates extending between said hub and a central base portion of each tooth that forms the pitch circle thereof, and a separate ink pad extending between each adjacent pair of said radial plates and between the peripheral portion of said hub and said base portion of said teeth that extends away from said central portion thereof.

2. The ink wheel as defined in claim 1 wherein each one of a series of said ink pads is of a different color.

3. A construction for a print wheel and an ink pad wheel to maintain them in synchronous step-by-step rotatable driving relationship with one another, comprising a series of characterized gear teeth, each having a marking element extending therefrom, on the outer periphery of the print wheel, and a series of characterized gear teeth on the outer periphery of the ink wheel, a base portion of each of said ink wheel teeth being recessed to provide a cover for peripheral end portions of each one of a different pair of adjacent pads that are retained by said ink wheel, said ink wheel teeth being positioned to extend outwardly therefrom and into rotary meshing engagement with said teeth of said print wheel, and said teeth of said print wheel and ink wheel being positioned to enable each of said marking elements to be continuously brought into engagement with a peripheral portion of an associated one of said ink wheel pads as said wheels are moved in said step-by-step rotatable driving relationship with one another.

4. The ink wheel as defined in claim 3 wherein each one of a series of said ink pads is of a different color.

5. A multiple point recorder, comprising a chassis, a shaft supported for rotation on said chassis, a printing means, a carriage supporting said printing means for slidable traversing movement along said shaft and for rocking movement about said shaft between a printing and a non-printing position, and drive means connected to said shaft to continuously transmit rotary movement thereto, said rotary movement of said shaft thereby being effective to minimize the static friction occurring between said shaft and said carriage as said carriage traverses said shaft and is rocked about said shaft between said printing and non-printing positions.

6. The multiple point recorder defined by claim 5 wherein said carriage is connected to a balancing motor that is in circuit with a balancing slide wire, an arm is supported at one end on said carriage for movement across a chart, and an opposite end of said arm has wiping wire contacts for engaging said balancing slide wire, said wiping wire contacts of said arm having joint movement with said carriage along said balancing slide wire to an electrical balance position thereon as said carriage is moved from one printing position to another.

7. An ink pad wheel, comprising a disc, spaced apart gear teeth formed on the periphery of said disc, a recess in said disc that extends under and between a base portion of each adjacent pair of said teeth, whereby each of said recesses provides an open end chamber for retaining a separate pad of said ink wheel therein.

8. A construction for a print wheel and an inking wheel to maintain them in synchronous step-by-step rotatable driving relationship with one another, comprising gear teeth on the periphery of said print wheel having marking elements thereon, gear teeth on the periphery of said inking wheel, a recess extending under and between a base portion of each adjacent pair of said teeth on said inking wheel, and a separate ink pad filling each of said recesses, said teeth on said print wheel and said teeth on said inking wheel being positioned for consecutive rotatable meshing engagement with one another, and each of said marking elements being positioned to successively engage an associated one of said pads as said teeth of said wheels are rotated into meshing engagement with one another.

9. A construction for a print wheel and an ink pad wheel to maintain them in synchronous step-by-step rotatable driving relationship with one another, comprising spaced apart gear teeth forming the peripheral surface of said print wheel, each of said teeth having an addendum portion thereof removed and a marking element extending outwardly from the central remaining peripheral portion of each tooth, and gear teeth on the outer periphery of said ink pad wheel, each of said latter mentioned teeth having a dedendum portion removed to the pitch circle thereof, said ink wheel teeth being positioned to extend outwardly therefrom and into rotary meshing engagement with said teeth of said print wheel, and said teeth on said print wheel and ink wheel being positioned to enable each of said marking elements to be continuously brought into engagement with a peripheral portion of an associated one of said ink wheel pads as said wheels are moved in said step-by-step rotatable driving relationship with one another.

* * * * *